United States Patent [19]

Wheatley et al.

[11] Patent Number: 5,333,275
[45] Date of Patent: Jul. 26, 1994

[54] SYSTEM AND METHOD FOR TIME ALIGNING SPEECH

[76] Inventors: Barbara J. Wheatley, 2009 Pleasant Valley Dr., Plano, Tex. 75023; Charles T. Hemphill, 112 Greenwood Ct., Coppell, Tex. 75019; Thomas D. Fisher, 19251 Preston Rd., #723, Dallas, Tex. 75252; George R. Doddington, 109 Brookside Dr., Portola, Calif. 94028

[21] Appl. No.: 903,033

[22] Filed: Jun. 23, 1992

[51] Int. Cl.[5] ............................................. G10L 9/02
[52] U.S. Cl. ................................. 395/2.52; 395/2.4
[58] Field of Search ................................. 381/29–53; 395/2.52, 2.4

[56] References Cited

U.S. PATENT DOCUMENTS

| | | | |
|---|---|---|---|
| 4,912,768 | 3/1990 | Benbassat | 381/52 |
| 4,977,598 | 12/1990 | Doddington et al. | 381/43 |
| 5,170,432 | 12/1992 | Hackbarth et al. | 381/43 |
| 5,193,142 | 3/1993 | Zhao | 395/2 |

OTHER PUBLICATIONS

Lamel, Lori F., et al., *Speech Database Development: Design and Analysis of Acoustic-Phonetic Corpus*, pp. 100–104.
Fisher, William M., et al., *The Darpa Speech Recognition Research Database: Specifications and Status.*, Texas Instruments Inc., Computer Science Center, Dallas, Tex., pp. 93–99.
J. J. Godfrey, E. C. Holliman and J. McDaniel, "Switchboard: Telephone Speech Corpus for Research and Development," *Proc. ICASSP* 92, 1992, pp. I-517 to I-520.
H. C. Leung and V. W. Zue, "A Procedure for Automatic Alignment of Phonetic Transcriptions with Continuous Speech," *Proc. ICASSP* 84, 1984, pp. 2.7.1–2.7.4.
A. Ljolje and M. D. Riley, "Automatic Segmentation and Labeling of Speech," *Proc. ICASSP* 91, 1991, pp. 473–476.
G. R. Doddington, "Phonetically Sensitive Discriminants for Improved Speech Recognition," *Proc. ICASSP* 89, 1989, pp. 556–559.
P. Dalsgaard, O. Andersen, W. Barry and R. Jorgensen, "On the Use of Acoustic-Phonetic Features in Interactive Labelling of Multi-Lingual Speech Corpora," *Proc. ICASSP* 92, 1992, pp. I-549 to I-552.

*Primary Examiner*—Michael R. Fleming
*Assistant Examiner*—Michelle Doerrler
*Attorney, Agent, or Firm*—Robert L. Troike; Richard L. Donaldson

[57] ABSTRACT

A method and system are provided for time aligning speech. Speech data is input representing speech signals from a speaker. An orthographic transcription is input including a plurality of words transcribed from the speech signals. A sentence model is generated indicating a selected order of the words in response to the orthographic transcription. In response to the orthographic transcription, word models are generated associated with respective ones of the words. The orthographic transcription is aligned with the speech data in response to the sentence model, to the word models and to the speech data.

46 Claims, 3 Drawing Sheets

FIG. 5b

SYSTEM AND METHOD FOR TIME ALIGNING SPEECH

TECHNICAL FIELD OF THE INVENTION

This application relates in general to speech processing and in particular to a method and system for time aligning speech.

BACKGROUND OF THE INVENTION

Time alignment of orthographic transcriptions with speech data is important for effectively using speech corpora. An exemplary corpus includes approximately 2500 conversations collected over long-distance telephone lines. Each conversation includes 5 to 10 minutes of unscripted speech signals from multiple interlocutors. Unscripted speech is spontaneously produced speech, as compared to speech read from a predetermined text. Each channel is recorded separately so that speech data can be separated or combined at will.

For speech research, it is frequently desirable to process each file in such a corpus to determine the timing of each speaker's turn and the timing of each word in the orthographic transcription. Sufficient precision is desired so that words of interest can be localized to a small segment of the speech data. Such timing information is useful in developing, training, and testing of systems relating to speaker identification, word spotting, and large-vocabulary speech recognition.

Some previous techniques for automatic time alignment of speech use independently-supplied manually generated phonetic transcriptions. However, the manual generation of phonetic transcriptions is cumbersome, expensive and frequently impractical, especially where the corpus size is large. To avoid having to manually generate phonetic transcriptions, other previous techniques have attempted to determine time alignment directly from orthographic transcriptions, attempting to achieve correct time alignment at the phonetic level on relatively tractable data such as speech data collected from individuals reading sentences recorded in a controlled environment.

Nevertheless, such previous techniques for time alignment typically fail to adequately address a number of challenges presented by a corpus of speech data that realistically represents characteristics of real world conversations. For example, such previous techniques typically fail to adequately address challenges presented by a corpus of speech data in which each speech data file is recorded continuously for several (at least five) minutes of time. Also, such previous techniques typically fail to adequately address challenges presented by speech data having instances of simultaneous speech, and by unscripted speech signals having a wide range of linguistic material characteristic of spontaneous speech. Further, such previous techniques typically fail to adequately address challenges presented by speech signals from multiple interlocutors, and by speech data collected over the publicly switched telephone network or from air traffic control radio transmissions.

Thus, a need has arisen for a method and system for time aligning speech for a corpus of speech data that realistically represents characteristics of real world conversations. Also, a need has arisen for a method and system for effectively time aligning speech, despite a corpus of speech data in which each speech data file is recorded continuously for several minutes of time. Further, a need has arisen for a method and system for effectively time aligning speech, despite speech data having instances of simultaneous speech. Moreover, a need has arisen for a method and system for effectively time aligning speech, despite unscripted speech signals having a wide range of linguistic material characteristic of spontaneous speech. Additionally, a need has arisen for a method and system for effectively time aligning speech, despite speech signals being from multiple interlocutors. Finally, a need has arisen for a method and system for effectively time aligning speech, despite speech data being collected over the publicly switched telephone network or from air traffic control radio transmissions.

SUMMARY OF THE INVENTION

In a method and system for time aligning speech, speech data is input representing speech signals from a speaker. An orthographic transcription is input including a plurality of words transcribed from the speech signals. A sentence model is generated indicating a selected order of the words in response to the orthographic transcription. In response to the orthographic transcription, word models are generated associated with respective ones of the words. The orthographic transcription is aligned with the speech data in response to the sentence model, to the word models and to the speech data.

In one aspect of the present invention, the word models are generated from pronunciation representations formed independent of the speech data. In another aspect of the present invention, the speech data represent speech signals from multiple interlocutors. In yet another aspect of the present invention, the speech data represent unscripted speech signals from a speaker.

It is a technical advantage of the present invention that transcribed speech is aligned for a corpus of speech data that realistically represents characteristics of real world conversations.

It is another technical advantage of the present invention that transcribed speech is effectively aligned, despite a corpus of speech data in which each speech data file is recorded continuously for several minutes of time.

It is a further technical advantage of the present invention that transcribed speech is effectively aligned, despite speech data having instances of simultaneous speech.

It is yet another technical advantage of the present invention that transcribed speech is effectively aligned, despite unscripted speech signals having a wide range of linguistic material characteristic of spontaneous speech.

It is yet a further technical advantage of the present invention that transcribed speech is effectively aligned, despite speech signals being from multiple interlocutors.

In another technical advantage of the present invention, transcribed speech is effectively aligned, despite speech data being collected over the publicly switched telephone network.

In a further technical advantage of the present invention, transcribed speech is effectively aligned, despite the narrow bandwidth of the publicly switched telephone network.

In yet another technical advantage of the present invention, transcribed speech is effectively aligned, despite cross channel echo characteristics of the publicly switched telephone network.

In yet a further technical advantage of the present invention, transcribed speech is effectively aligned, despite speech data being collected from air traffic control radio transmissions.

In still another technical advantage of the present invention, transcribed speech is effectively aligned, despite speech signals including significant amounts of channel noise and background noise.

In an even further technical advantage of the present invention, transcribed speech is effectively aligned, despite concurrent use by multiple interlocutors of different microphones having significant varying effects on speech signals.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1 through 6 of the drawings, like numerals being used for like and corresponding parts of the various drawings.

Figure 1:
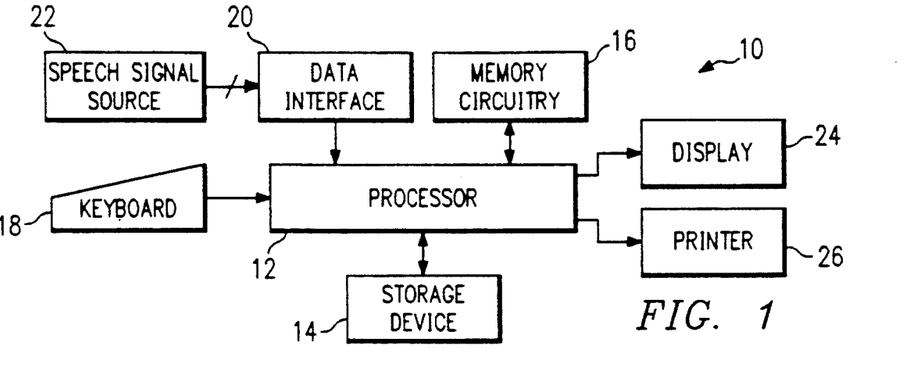
FIG. 1 is a block diagram of process circuitry for time aligning speech according to the system of the preferred embodiment.

FIG. 1 is a block diagram of process circuitry, indicated generally at 10, for time aligning speech according to the system of the preferred embodiment. Process circuitry 10 includes a processor 12 programmed in accordance with the preferred embodiment for time aligning speech. Processor 12 is connected to a nonvolatile storage device 14, including fixed and non-fixed disk storage systems and associated disk controller circuitry. Storage device 14 inputs, stores and outputs digital data such as speech data, instructions and other data used by process circuitry 10 in time aligning speech according to the preferred embodiment. Processor 12 reads digital data and instructions from storage device 14, as needed, to perform the alignment of transcribed speech. Moreover, processor 12 writes digital data to storage device 14 so that results of the alignment process are stored in a non-volatile manner. The alignment technique of the preferred embodiment is described further hereinbelow in connection with FIGS. 2–6.

Processor 12 is further connected to fast-access memory circuitry 16, such as dynamic random access memory ("DRAM"). Memory circuitry 16 inputs, stores and outputs instructions and other frequently accessed data as directed by processor 12 during the alignment process. By storing frequently accessed data in fast-access memory circuitry 16 instead of in storage device 14, the speed of alignment is increased. A human operator (not shown) can specify commands and data to processor 12 using a keyboard 18.

A data interface 20 inputs digital speech data representing unscripted speech signals from multiple human interlocutors in conversation. Data interface 20 inputs the digital speech data from multiple channels, so that speech data from any one of the channels represent speech signals from an associated one of the interlocutors. In the preferred embodiment, processor 12 inputs the speech data from data interface 20 and combines the speech data from the multiple channels into a single channel. In an alternative embodiment, data interface 20 combines the speech data from the multiple channels into a single channel, such that processor 12 inputs the combined speech data. In another alternative embodiment, neither data interface 20 nor processor 12 combines the speech data. In yet another alternative embodiment, data interface 20 inputs the speech data from a single channel instead of multiple channels.

In an exemplary embodiment, a speech signal source 22 includes a T1 line from the publicly switched telephone network having multiple communications channels, and data interface 20 includes T1 interface circuitry connected between the T1 line and processor 12. In such an exemplary embodiment, the T1 interface circuitry of data interface 20 inputs 8-bit $\mu$-law digital speech data sampled at 8 kHz (8000 integers per second). Such data is input by data interface 20 from the T1 line of speech signal source 22 for interfacing to processor 12.

In another exemplary embodiment, speech signal source 22 includes a wireless communications device of an air traffic control system, and data interface 20 includes digitizer circuitry connected between a receiver and processor 12. In such an exemplary embodiment, the digitizer circuitry of data interface 20 inputs speech signals from the receiver and converts the speech signals into 16-bit linear sampled digital speech data for interfacing to processor 12.

Processor 12 inputs the digital speech data from data interface 20, and processor 12 stores the digital speech data in storage device 14. After storing the digital speech data in storage device 14, processor 12 performs the alignment of transcribed speech and stores the results in storage device 14. Moreover, processor 12 may display results of the alignment process on a display 24 and may print the results on a printer 26. In the preferred embodiment, process circuitry 10 includes a Sun Microsystems SPARCstation 2 having 64 Mbytes of memory. The alignment technique of the preferred embodiment is described further hereinbelow in connection with FIGS. 2–6.

In a significant aspect of the preferred embodiment, process circuitry 10 effectively aligns speech data (representing speech signals from a speaker) with an orthographic transcription that includes words transcribed orthographically from the speech signals, despite the speech data representing speech signals from multiple human interlocutors in unscripted conversation over the publicly switched telephone network and from air traffic control radio transmissions. Accordingly, process circuitry 10 effectively aligns the orthographic transcription with speech data, despite the speech signals including significant amounts of channel noise and background noise. Moreover, process circuitry 10 effectively performs the alignment, despite concurrent use by the multiple interlocutors of different microphones having significant varying effects on the speech signals. Further, process circuitry 10 effectively performs the alignment, despite the narrow bandwidth of the publicly switched telephone network failing to encompass the full bandwidth of human speech, and despite cross channel echo characteristics of the publicly switched telephone network.

By effectively aligning unscripted speech data, process circuitry 10 advantageously determines timing information for a corpus of speech data that realistically represents characteristics of real world telephone conversations. By comparison, scripted speech data is collected from a speaker engaged in reading a predetermined script, which less realistically represents characteristics of real world telephone conversations. Time alignment of unscripted speech data is challenging.

Unlike scripted speech, the style of unscripted speech is not careful and deliberate. Unscripted speech is frequently rapid and not clearly enunciated. Further, relative to scripted speech, unscripted speech has an unconstrained vocabulary range of words and has a broad range of syntactic patterns including ill-formed sentences. In addition, unscripted speech is more likely to have disfluencies such as false starts and hesitations. Also, prolonged pronunciations of hesitation sounds and certain words are more likely.

Process circuitry 10 also effectively aligns speech data collected from multiple interlocutors. In doing so, process circuitry 10 advantageously aligns speech data that realistically represent characteristics of real world telephone conversations. Time alignment of speech data collected from multiple interlocutors is challenging. In a significant aspect of the preferred embodiment described further hereinbelow in connection with FIGS. 2-6, process circuitry 10 effectively aligns speech data having instances of simultaneous speech, which is possible even in scripted conversations between multiple interlocutors.

In another significant aspect of the preferred embodiment, process circuitry 10 effectively aligns the orthographic transcription with a corpus of speech data in which each speech data file is recorded continuously for several minutes of time. For example, process circuitry 10 has successfully aligned speech data from unscripted long-distance telephone conversations extending from five to ten minutes. By successfully aligning such extended speech data, process circuitry 10 advantageously determines timing information for a large corpus of speech data that represents characteristics of real world telephone conversations. Such timing information is useful in developing, training, and testing of systems relating to speaker identification, word spotting, and large-vocabulary speech recognition.

Figure 2:
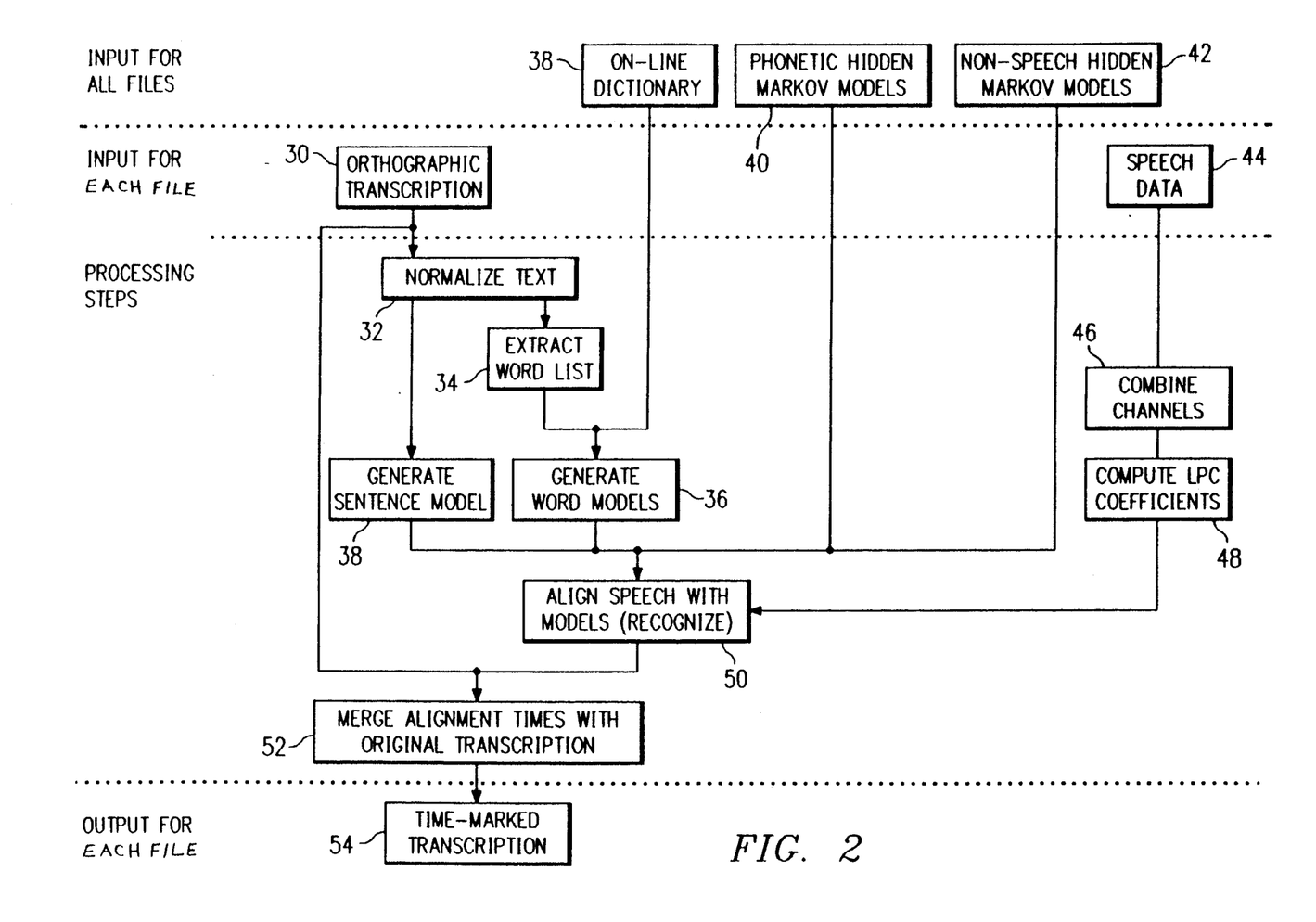
FIG. 2 is a data flow diagram of a method for time aligning speech according to the preferred embodiment.

FIG. 2 is a data flow diagram of a method performed by process circuitry 10 for time aligning speech according to the preferred embodiment. For a particular speech data file, in block 30, process circuitry 10 inputs an orthographic transcription including words manually transcribed from the speech signals. An orthographic transcription represents conventional spellings (e.g. "Oh, really") of words, as compared to a phonetic transcription that represents sounds (e.g. "ow r ih l iy") in words. Such an orthographic transcription of speech is represented in digital form by ASCII codes. Advantageously, a manually generated orthographic transcription is significantly less laborious and less expensive to generate than a manually generated phonetic transcription. Following is an exemplary section of an orthographic transcription input by process circuitry 10 in block 30.

Speaker A (male): I, I, I, assume you have kids {Music in background}.

Speaker B (female): Uh, we have one. She's only nine months old.

Speaker A: Oh, well she, she doesn't have to worry about public schools yet.

Speaker B: Right. Well, my degree is in teaching,

Speaker A: Yeah. Well,

Speaker B: (( )).

Speaker A: we have a little bit of a basis for conversation. I was a substitute teacher for about a year.

Speaker B: Oh, really.

Speaker A: Yeah. I, uh, thought I wanted to be a teacher so, but before I went through all of that I wanted to see how I was going to like it.

Speaker B: Uh-huh.

Speaker A: And, and they, uh, in Alabama, where I came from they, they allow you to substitute if you got a four year degree. So I went out and played substitute for a while and decided, nope, not for me.

Speaker B: Well our tenth anniversary is coming up #in October#.

Speaker A: #Oh really#,

Speaker B: #Uh-huh#.

Speaker A: #I#didn't know that.

Speaker B: Yeah. And, uh, [sigh]I'd like to, yo-, even if we just get away for three or four days, I think it would be kind of neat.

Speaker A: Okay. Where have you been on vacation lately?

Speaker B: Um, well the last vacation I went was to Cozumel,

Speaker A: Oh yeah.

Speaker B: and that was last, uh, March and April.

As the above-listed exemplary section of transcription indicates, a conversation in the corpus is transcribed orthographically with speaker turns indicated. Instances of simultaneous speech are also identified in the orthographic transcription by "#" symbols. For example, in the above-listed orthographic transcription example, the transcription segments "in October" (Speaker B) and "Oh really" (Speaker A) are identified as being simultaneous. Similarly, the transcription segments "Uh-huh" and "I" are identified as being simultaneous.

Non-speech sounds, such as breath noises and laughter, are also indicated in the orthographic transcription. After inputting the orthographic transcription in block 30, process circuitry 10 normalizes the text of the orthographic transcription in block 32 by removing punctuation and editorial comments (e.g., "{Music in background}"). Optionally, process circuitry 10 can further normalize the text of the orthographic transcription in block 32 by removing non-speech sounds (e.g. "[sigh]").

After normalizing the text of the orthographic transcription in block 32, process circuitry 10 extracts a list of selected words in the orthographic transcription in block 34. In such an extracted word list, process circuitry 10 lists each word of the orthographic transcription once, so that duplicate listings of the same word do not occur.

After extracting the word list in block 34, process circuitry 10 generates word models in block 36. Each word model is associated with a respective word in the extracted word list. The word models indicate phonetic Hidden Markov Models ("HMM's") for modelling each word in the extracted word list. Process circuitry 10 generates the word models from pronunciation representations stored in a 240,000-entry on-line dictionary 38. Since each word is listed only once in the extracted word list, process circuitry 10 advantageously avoids the inefficient generation of redundant word models. Exemplary word models are described further hereinbelow in connection with FIGS. 3a–b.

After normalizing the text of the orthographic transcription in block 32, and in addition to extracting the word list in block 34 and generating word models in block 36, process circuitry 10 generates a single sentence model in block 38 for the entire orthographic transcription. An exemplary sentence model is described further hereinbelow in connection with FIG. 4.

For all speech data files, in block 40, process circuitry 10 inputs phonetic Hidden Markov Models ("HMM's"). Also, for all speech data files, in block 42, process circuitry 10 inputs non-speech HMM's. Such non-speech HMM's include explicit recognition models for silence, inhalation, exhalation and lip smack. Other non-speech sounds are not explicitly modeled by process circuitry 10, but instead are accommodated by a score threshold that automatically classifies as non-speech any input frame that insufficiently matches the recognition models.

The HMM's input in block 40 and block 42 are multivariate Gaussian continuous density HMM's using acoustic vectors of speech parameters representing energy and spectral characteristics for 20 ms frames of the speech signals. In block 40 of the preferred embodiment, process circuitry 10 inputs forty-seven context independent phonetic HMM's. Each of the forty-seven phonetic HMM's has two phonetic variants, one trained on male speakers and one trained on female speakers, such that a total of ninety-four phonetic HHM's are input in block 40. The sex of each speaker determines which of the two phonetic variants is specified in the supervision grammar sentence model generated in block 50.

The HMM's input by process circuitry 10 in blocks 40 and 42 are speaker independent and not trained on the speech corpus to be aligned. In an exemplary embodiment, the HMM's are trained on 1000 phonetically-balanced sentences in the Voice Across America long-distance telephone speech database.

For a particular speech data file, in block 44, process circuitry 10 inputs speech data as described further hereinabove in connection with FIG. 1. In block 46, process circuitry 10 combines speech data from multiple channels as described further hereinabove in connection with FIG. 1. By combining speech data according to the preferred embodiment, process circuitry 10 advantageously uses approximately one-half the processing time otherwise necessary for aligning the orthographic transcription with the speech data.

Moreover, by combining speech data, process circuitry 10 substantially avoids alignment errors within and across long "silence" segments of a channel's speech data where another channel's speaker is speaking. Accordingly, process circuitry 10 substantially avoids alignment errors where strong cross-channel echo induces errors in single-channel alignment, such as where a supervision grammar sentence model for one channel fails to represent a relatively strong speech signal from another channel. Without combining speech data, such an unrepresented strong speech signal might lead to spurious alignments resulting in overall alignment failure.

In an alternative embodiment, process circuitry 10 does not combine speech data from multiple channels, but instead aligns the orthographic transcription from block 30 with speech data from each channel separately.

In response to the combined speech data from block 46, in block 48 process circuitry computes 10th order linear predictive coding ("LPC") coefficients with 20 ms frames for feature extraction. In block 50, process circuitry 10 automatically aligns the orthographic transcription with the speech data using speaker-independent hierarchical-grammar speech recognition techniques supervised by the sentence and word models generated in blocks 38 and 36, respectively. In performing the alignment process in block 50, process circuitry 10 reads the sentence model generated in block 38, the word models generated in block 36, the phonetic HMM's input in block 40, the non-speech HMM's input in block 42, and the LPC coefficients computed in block 48.

Preferably, the speech recognition technique is sophisticated in its treatment of multilayer grammars. In the preferred embodiment, process circuitry 10 uses a pooled covariance evaluation metric. Also, process circuitry 10 uses Viterbi decoding to compute the maximum likelihood path through the sentence, word, phonetic, and non-speech models corresponding to the input speech data. An exemplary speech recognition technique used by process circuitry 10 is discussed in G. R. Doddington, "Phonetically Sensitive Discriminants for Improved Speech Recognition," *Proceedings on International Conference on Acoustics, Speech, and Signal Processing (ICASSP)* 1989, which is hereby incorporated by reference herein.

By performing the alignment process supervised by the sentence model (block 38) and word models (block 36), process circuitry 10 advantageously uses a hierarchy of regular grammars to constrain alignment. By supervising the alignment process, fewer alignment errors result, since fewer recognition models are considered as possible candidates for matching speech data at a given frame.

As process circuitry 10 performs the alignment process in block 50, it outputs words in the sentence model together with each word's beginning time and duration. TABLE 1 shows an exemplary alignment output provided by process circuitry 10 for the following section of the above-listed orthographic transcription:

Speaker A: . . . about a year.
. Speaker B: Oh, . . .

In the "Model Level" column of TABLE 1, a "1" indicates the word level, and a "2" indicates the phonetic level. The sentence level, which is not shown, would be indicated by a "0". Accordingly, in block 50, process circuitry 10 provides an alignment output at the word level and at the phonetic level.

As TABLE 1 demonstrates, the alignment output provided by process circuitry 10 indicates a recognition score determined by process circuitry 10 for each word model (e.g. ABOUT_m indicating the word "about" transcribed from speech signals of a male speaker), phonetic HMM (e.g. ow_f indicating the female HMM for phoneme "ow" specified by the word model OH_f), and non-speech HMM (e.g. $silence$_{13}$ f indicating the "<BACKGROUND>" instance of "silence") listed in the alignment output. TABLE 1 further shows, relative to the speech data from block 44, the start time, duration, and output time determined by process circuitry 10 for each listed word model, phonetic PEMM, and non-speech HMM.

In block 52, process circuitry 10 merges the alignment times from block 50 with the orthographic transcription output from block 30 in order to output a time-aligned ("time-marked") orthographic transcription at block 54 showing speaker turn times and spoken words.

TABLE 2 shows an exemplary time-marked orthographic transcription provided by process circuitry 10 for the following section of the above-listed orthographic transcription:

Speaker B: ... anniversary is coming up #in October#.
Speaker A: #Oh really#,
Speaker B: #Uh-huh#.
Speaker A: #I#didn't know that.
Speaker B: Yeah. And, uh, [sigh ]I'd like to, yo-, even if we ...

As TABLE 2 demonstrates, the time-marked orthographic transcription provided by process circuitry 10 indicates a start time and duration determined by process circuitry 10 for each word (e.g. "anniversary") listed in the time-marked orthographic transcription. The start times and durations indicated in the time-marked orthographic transcription of block 54 are identical to those indicated in the alignment output of block 50. In the time-marked orthographic transcription of block 54, TABLE 2 further shows speaker turns for each listed word (e.g. Speaker "A" for the word "know").

Similar to the orthographic transcription of block 30, the time-marked orthographic transcription of block 54 identifies instances of simultaneous speech by "#" symbols. For example, the transcription segments "in October" (Speaker B) and "Oh really" (Speaker A) are identified as being simultaneous. Significantly, process circuitry 10 selects only one of the simultaneous transcription segments for alignment at the word level. More specifically, process circuitry 10 selects the simultaneous transcription segment that aligns with greatest confidence.

For example, in TABLE 2, the transcription segment "in October" is time-marked, but the simultaneous transcription segment "Oh really" is not time-marked. Nevertheless, since the simultaneous speech segment is relatively short, the transcription segment "Oh really" is sufficiently localized to the small segment of speech data aligned with the time-marked transcription segment "in October". Similarly, although the transcription segment "I" is not time-marked, it is sufficiently localized as being simultaneous with the time-marked transcription segment "Uh-huh".

TABLE 1

| | ALIGNMENT OUTPUT | | | | |
|---|---|---|---|---|---|
| Score | Start Time | Duration | Output Time | Model Level | Model Name |
| 2.0651 | 15.82 | 0.22 | 599.42 | 1 | ABOUT_m |
| 4.2591 | 15.82 | 0.02 | 599.42 | 2 | ah_m |
| 1.4037 | 15.84 | 0.06 | 599.42 | 2 | b_m |
| 1.7613 | 15.90 | 0.12 | 599.42 | 2 | aw_m |
| 3.6778 | 16.02 | 0.02 | 599.42 | 2 | t_m |
| 1.2504 | 16.04 | 0.08 | 599.42 | 1 | A_m |
| 1.2504 | 16.04 | 0.08 | 599.42 | 2 | ey_m |
| 1.3060 | 16.12 | 0.32 | 599.42 | 1 | YEAR_m |
| 1.2047 | 16.12 | 0.10 | 599.42 | 2 | y_m |
| 2.6452 | 16.22 | 0.04 | 599.42 | 2 | ih_m |
| 1.0647 | 16.26 | 0.18 | 599.42 | 2 | axr_m |
| 1.4954 | 16.44 | 0.22 | 599.42 | 1 | <BACKGROUND> |

TABLE 1-continued

| | ALIGNMENT OUTPUT | | | | |
|---|---|---|---|---|---|
| Score | Start Time | Duration | Output Time | Model Level | Model Name |
| 1.4954 | 16.44 | 0.22 | 599.42 | 2 | $silence_f |
| 1.5270 | 16.66 | 0.22 | 599.42 | 1 | OH_f |
| 1.5270 | 16.66 | 0.22 | 599.42 | 2 | ow_f |

TABLE 2

| TIME-MARKED ORTHOGRAPHIC TRANSCRIPTION | | | |
|---|---|---|---|
| Speaker | Start Time | Duration | Word |
| B | 99.74 | 0.52 | anniversary |
| B | 100.26 | 0.06 | is |
| B | 100.36 | 0.36 | coming |
| B | 100.72 | 0.20 | up |
| B | 100.92 | 0.10 | #in |
| B | 101.02 | 0.80 | October# |
| B | • | • | ... |
| A | • | • | #Oh |
| A | • | • | really,# |
| B | 101.96 | 0.50 | #Uh-huh.# |
| A | • | • | #I# |
| A | 102.46 | 0.08 | didn't |
| A | 102.54 | 0.28 | know |
| A | 102.82 | 0.22 | that. |
| B | 103.46 | 0.18 | Yeah. |
| B | 103.64 | 0.42 | And, |
| B | 104.08 | 0.08 | uh, |
| B | • | • | [sigh] |
| B | 104.16 | 0.36 | I'd |
| B | 106.12 | 0.30 | like |
| B | 106.42 | 0.36 | to, |
| B | • | • | yo-, |
| B | 106.80 | 0.30 | even |
| B | 107.10 | 0.16 | if |
| B | 107.26 | 0.14 | we |

Figure 3A:
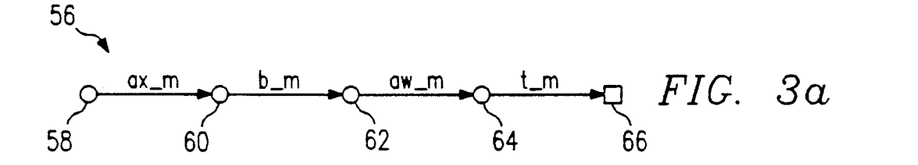
FIGS. 3a-b illustrate exemplary word models.

FIG. 3a illustrates an exemplary word model, indicated generally at 56, for the word "about" as spoken by a male. As described further hereinabove in connection with FIG. 2, process circuitry 10 generates word models in block 36. For each word in the extracted word list of block 34, process circuitry 10 generates an associated finite-state word model from one or more alternative pronunciations represented in on-line dictionary 38.

In a significant aspect of the preferred embodiment, the word models are generated from pronunciation representations formed independent of the speech data. Such independently formed pronunciation representations in on-line dictionary 38 are formed without reference to the particular speech corpus being aligned. By using such independently formed pronunciation representations, process circuitry 10 advantageously uses pronunciation representations having wide applicability. Moreover, process circuitry 10 saves processing time, since it is not required to form pronunciation representations with reference to the particular speech corpus being aligned.

For each pronunciation representation, process circuitry 10 generates a separate path through the word model. Further, process circuitry 10 generates separate paths through the word model for optional variants derived by applying phonological rules such as alveolar stop flapping and unstressed vowel reduction. A word model represents multiple pronunciations of its associated word by indicating alternative path sequences of phonetic HMM's for supervised acoustic-level alignment in block 50 (FIG. 2).

In FIG. 3a, word model 56 is generated from the pronunciation representation (about,=aj,{0,ah,2,- b,aw,t}) stored in on-line dictionary 38. The pronunciation representation indicates "ah" at a low stress level "0", followed by "b", "aw" and "t" at a high stress level "2". Although part-of-speech information is not used in the time alignment technique of the preferred embodiment, on-line dictionary 38 encodes part-of-speech information in the pronunciation representation as a string of one letter codes. APPENDIX I lists exemplary part-of-speech codes. Codes represent single or multiple parts-of-speech for the same entry where this does not affect the pronunciation (e.g., "jn", adjective or noun). For example, in the pronunciation representation for "about", the symbols "=aj" indicate the word "about" can function as a preposition ("="), adverb ("a"), or adjective ("j"). In the pronunciation representation, these codes are normally sorted in alphabetical order.

In the pronunciation representation for the word "about", one pronunciation alternative is represented. Accordingly, in FIG. 3a, a word model 56 begins at a node 58 allowing the male phonetic model for "ax" (ax_m). Significantly, node 58 allows the phonetic model for "ax" instead of "ah", thereby providing an example of the phonological rule of unstressed vowel reduction. At node 58, the path associated with the phonetic model for "ax" continues to a node 60 allowing the male phonetic model for "b" (b_m) At node 60, the path associated with the phonetic model for "b" continues to a node 62 allowing a male phonetic model for "aw" (aw_m). At node 62, the path associated with the phonetic model for "aw" continues to a node 64 allowing a male phonetic model for "t" (t_m). At node 64, the path associated with the phonetic model for "t" continues to a node 66 indicating the end of word model 56.

Figure 3B:
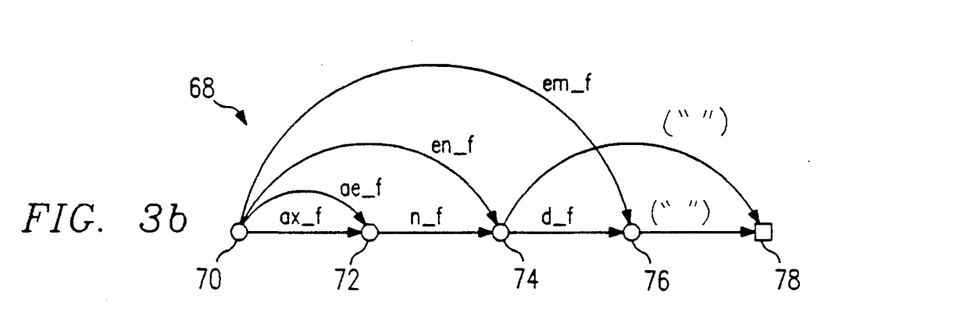

FIG. 3b illustrates an exemplary word model, indicated generally at 68, for the word "and" as spoken by a female. Word model 68 is generated from the pronunciation representation (and,&,{0,ah,n,{d;""}; {1;0},a-e,n,{d;""};0,en,{d;"";0,em}) stored in on-line dictionary 38. In the pronunciation representation for the word "and", multiple pronunciation alternatives are represented.

Accordingly, in FIG. 3b, word model 68 begins at a node 70 allowing female phonetic models for "ax" (ax$_{13}$ f), "ae" (ae_f), "en" (en_f), and "em" (em_f). At node 70, the path associated with the phonetic model for "ax" continues to a node 72 allowing a female phonetic model for "n" (n_f). Also, at node 70, the path associated with the phonetic model for "ae" continues to node 72. Further, at node 70, the path associated with the phonetic model for "en" continues to a node 74 allowing a female phonetic model for "d" (d_f) and allowing transition to a node 78 with no input. Moreover, at node 70, the path associated with the phonetic model for "em" continues to a node 76 allowing transition to node 78 with no input.

At node 72, the path associated with the phonetic model for "n" continues to node 74. At node 74, the path associated with the phonetic model for "d" continues to node 76. Also, at node 74, the path ("") allows transition with no input to node 78 indicating the end of word model 68. At node 76, the path ("") allows transition with no input to node 78.

Figure 4:
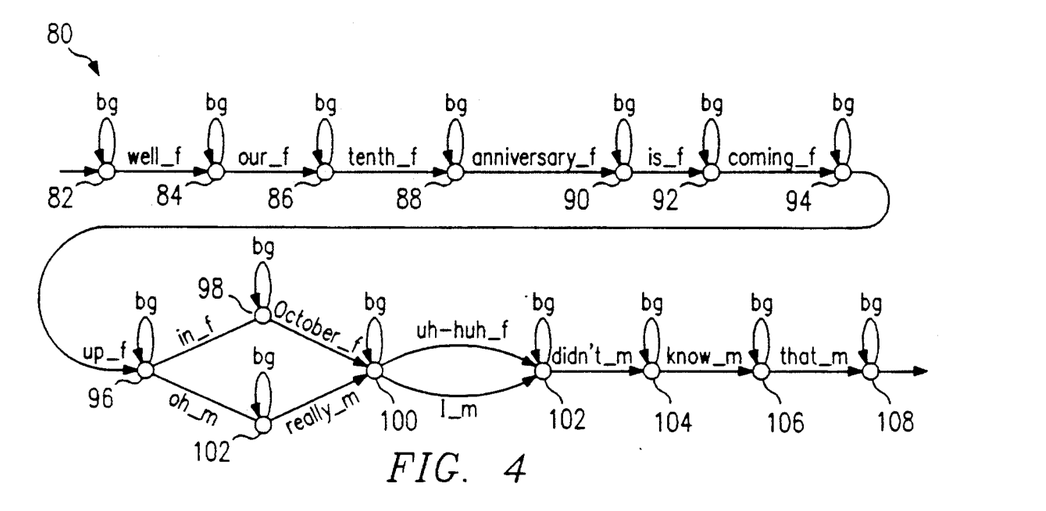
FIG. 4 illustrates an exemplary section of a sentence model.

FIG. 4 illustrates an exemplary section, indicated generally at 80, of a sentence model for the following section of the above-listed orthographic transcription.

Speaker B: Well our tenth anniversary is coming up #in October#.
Speaker A: #Oh really#,
Speaker B: #Uh-huh#.
Speaker A: #I#didn't know that.

Section 80 of the sentence model begins at a node 82 and further includes nodes 84–108. Each of nodes 82–108 allows background conditions. The path associated with background conditions at a particular one of nodes 82–108 self-loops at the particular node. Background conditions include recognized conditions that sufficiently match Hidden Markov Models ("HMM's") for silence, lip smacking, inhalation and exhalation. At a particular node, background conditions further include unrecognized "null" conditions that fail to satisfy a preselected score threshold for matching a word model allowed at the particular node. In this manner, process circuitry 10 effectively responds to unexpected non-speech or speech data such as background noise, channel noise, and partial words.

In addition to background conditions, node 82 allows the word model well_f. At node 82, the path associated with the word model well$_{13}$ f continues to a node 84 allowing background conditions and the word model our_f. At node 84, the path associated with the word model our f continues to a node 86 allowing background conditions and the word model tenth_f. At node 86, the path associated with the word model tenth_f continues to a node 88 allowing background conditions and the word model anniversary_f.

At node 88, the path associated with the word model anniversary_f continues to a node 90 allowing background conditions and the word model is_f. At node 90, the path associated with the word model is_f continues to a node 92 allowing background conditions and the word model coming_f. At node 92, the path associated with the word model coming_f continues to a node 94 allowing background conditions and the word model up_f.

At node 94, the path associated with the word model up_f continues to a node 96 allowing background conditions, the word model in f, and the word model oh_m. At node 96, the path associated with the word model in_f continues to a node 98 allowing conditions and the word model October_f. At node 98, the path associated with the word model October_f continues to a node 100 allowing background conditions, the word model uh-huh_f, and the word model I$_{13}$ m.

Also, at node 96, the path associated with the word model oh_m continues to a node 102 allowing background conditions and the word model really_m. At node 102, the path associated with the word model really_m continues to node 100.

In this manner, the sentence model advantageously divides into multiple alternative paths ("branches") at node 96, and the alternative paths eventually rejoin at node 100. Although each alternative path includes only one additional node (such as node 98) between node 96 and node 100, any number of such additional nodes can be included in response to simultaneous speech indicated in the orthographic transcription. Moreover, the number of such additional nodes can be different for each of the alternative paths.

At node 100, the path associated with the word model uh-huh_f continues to a node 102 allowing background conditions and the word model didn't_m. Also, at node 100, the path associated with the word model I_m continues to node 102. At node 102, the path associated with the word model didn't_m continues to a node 104 allowing background conditions and the word model know_m. At node 104, the path associated with the word model know_m continues to a node 106 allowing background conditions and the word model that_m. At node 106, the path associated with the word model that_m continues to a node 108 allowing background conditions and a next word model.

Accordingly, in response to the normalized text of the orthographic transcription, process circuitry 10 automatically generates a finite-state sentence model supervision grammar characterizing the normalized text. The sentence model characterizes the entire normalized text of the orthographic transcription as a single sentence. As illustrated in FIG. 4, process circuitry 10 generates the single sentence model beyond node 108 until the entire normalized text is modelled.

Except for simultaneous speech, the sentence model indicates a strict linear progression through the orthographic transcription. Significantly, instances of simultaneous speech can occur in situations where the orthographic transcription is aligned with speech data combined from multiple channels. Advantageously, instances of simultaneous speech are labeled by "#'s" in the orthographic transcription. Since it is normally impractical to precisely align interleaved words of simultaneous speech, a simplistic non-branching sentence model supervision grammar normally fails to provide satisfactory alignment results.

In the preferred embodiment, alternate paths are advantageously included in the sentence model for each segment of orthographic transcription having simultaneous speech. Supervised by such a sentence model of the preferred embodiment, process circuitry 10 selects only one of the simultaneous transcription segments for alignment at the word level. More specifically, process circuitry 10 selects the simultaneous transcription segment that aligns with greatest confidence. Using such a technique, process circuitry 10 effectively aligns transcribed speech, despite speech data having instances of simultaneous speech.

When executed on a Sun SPARCstation 2 with 64 Mbytes of memory, the automatic time alignment technique of the preferred embodiment averages less than five times real time for each conversation. The automatic alignment technique of the preferred embodiment has been effectively applied to more than 1058 conversations recorded and transcribed as part of the Switchboard corpus. These conversations exhibit a variety of challenging characteristics typical of long-distance telephone speech (limited bandwidth, handset variation, channel noise, background noise), spontaneous speech (hesitation phenomena, misarticulations and mispronunciations, non-speech sounds), and multiple-channel interaction (simultaneous speech, cross-channel echo). Speakers represent a variety of American English accents and range in age from 20 years to 60 years.

Significantly, only 13 (1.2%) of the 1058 conversations were unalignable. Random accuracy checks were performed on 888 of the conversations. Only 6 (0.7%) of these 888 conversations had 1-2 second misalignment that was not corrected within 10 seconds. Moreover, for each of 10 conversations, 30 seconds of speech was manually marked. For these 10 conversations, the majority of errors involved either unusually rapid speech or words prolonged beyond nominal duration (e.g. "uh"). Some errors resulted from channel noise, background noise, and low speech level when exceptionally severe or occurring in combination. The dominant error, with occasional misalignments of up to 2 seconds, involves hesitation sounds such as "uh." In the alignment procedure, such sounds are treated simply as normal lexical items, although they may in fact be prolonged beyond the duration typical of phonologically comparable words. By training recognition models for such sounds, their exceptional duration characteristics may be accommodated.

Figure 5A:
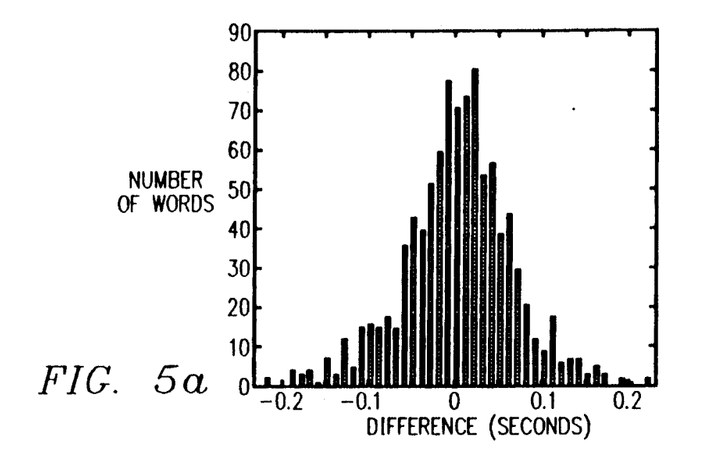
FIGS. 5a-c are graphs showing accuracy of the technique of the preferred embodiment.
Figure 5B:
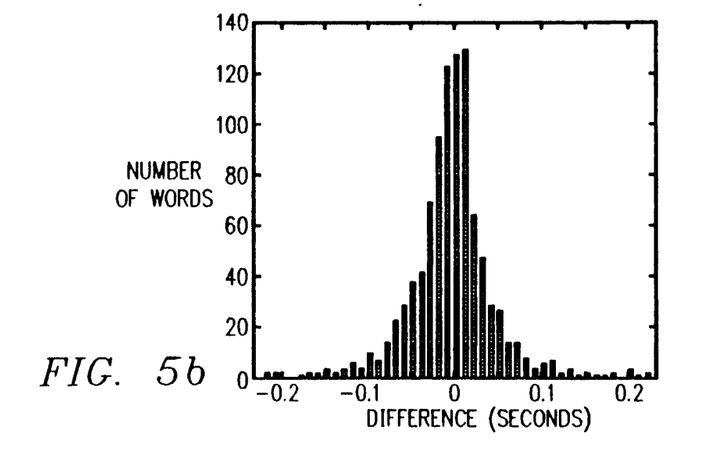
Figure 5C:
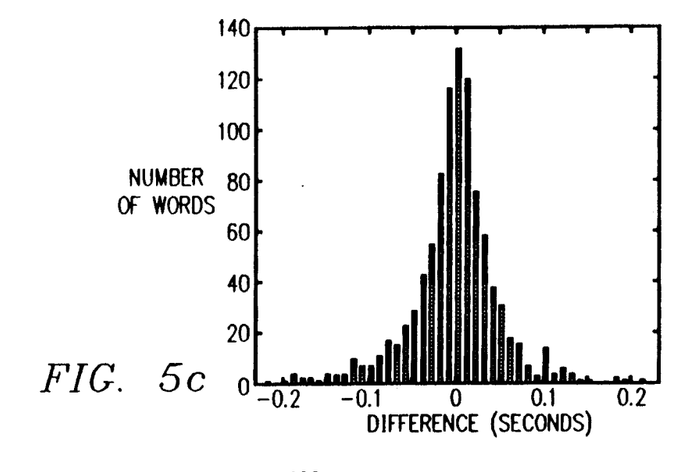

FIGS. 5a-c are graphs showing accuracy of the technique of the preferred embodiment relative to manually generated alignments of 30-second segments of speech data from ten separate conversations, for a total of five minutes of speech data. The graphs of FIGS. 5a-c represent only the 975 (95%) most closely aligned words from among 1025 total words.

The graph of FIG. 5a shows differences between the word durations determined by process circuitry 10 and those determined by the manually generated alignments. In FIG. 5a, the 975 most closely aligned words had a mean difference in duration of only −0.001 seconds and standard deviation of 0.064 seconds within a range of −0.22 and +0.22 seconds. The 1025 total words had a mean difference in duration of only −0.003 seconds and standard deviation of 0.080 seconds within a range of −0.62 and +0.42 seconds.

The graph of FIG. 5b shows differences between the word begin times determined by process circuitry 10 and those determined by the manually generated alignments. In FIG. 5b, the 975 most closely aligned words had a mean difference in begin time of only −0.005 seconds and standard deviation of 0.048 seconds within a range of −0.22 and +0.22 seconds. The 1025 total words had a mean difference in begin time of only −0.019 seconds and standard deviation of 0.134 seconds within a range of −1.60 and +0.51 seconds.

The graph of FIG. 5c shows differences between the word end times determined by process circuitry 10 and those determined by the manually generated alignments. In FIG. 5c, the 975 most closely aligned words had a mean difference in end time of only −0.004 seconds and standard deviation of 0.050 seconds within a range of −0.22 and +0.21 seconds. The 1025 total words had a mean difference in end time of only −0.022 seconds and standard deviation of 0.137 seconds within a range of −1.77 and +0.54 seconds.

The alignment technique of the preferred embodiment has proved robust under the variety of difficult conditions discussed above. For example, alignment is effectively performed, despite the presence of non-speech sounds such as breath noises and laughter. In response to an accurate orthographic transcription, performance is satisfactory for simultaneous speech segments, with process circuitry 10 selecting one speaker's speech for alignment.

For conversations in which recording begins on separate channels at slightly different times for multiple interlocutors, and in which a significant cross-channel echo occurs, a lag is perceptible between the speech signal and its cross-channel echo when the separate channels are combined into a single channel. The time alignment technique of the preferred embodiment has proved robust under this condition, making it unnecessary to resynchronize the channels before time-marking the speech data. Since the time alignment technique is reliable under such conditions, timing information from process circuitry 10 can be used in analyzing and resynchronizing the speech data.

Figure 6:
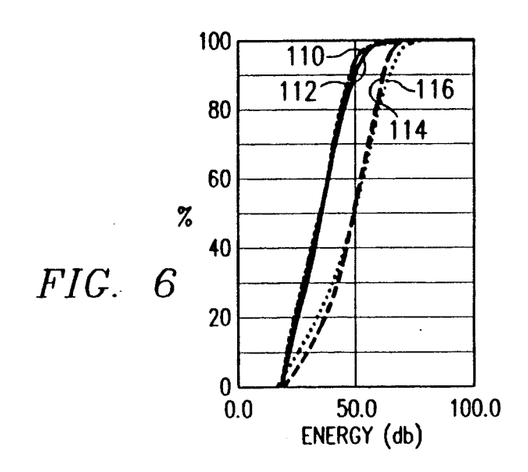
FIG. 6 is a graph of signal-echo separation identified using the technique of the preferred embodiment.

For example, the degree of signal-echo separation in speech data containing perceptible echo on two channels can be determined by using the time-marking to identify echo portions of the speech data. By identifying the echo, this technique facilitates resynchronization based on cross-correlations, or echo cancellation if desired as a data preprocessing operation. FIG. 6 is a graph of signal-echo separation identified using the technique of the preferred embodiment.

FIG. 6 shows results of a cumulative histogram segmentation, in which each (x,y) coordinate of curves 110, 112, 114 and 116 indicates a percentage (y-coordinate %) of speech data having energy at or below a certain energy level (x-coordinate dB). Curve 116 represents a Speaker A speaking on a Channel A, and curve 114 represents a Speaker B speaking on a Channel B. Curve 110 represents Speaker A echo on Channel B, and curve 112 represents Speaker B echo on Channel A.

Accordingly, the alignment technique of the preferred embodiment provides reliable time alignment with a relatively low expenditure of manual and computational effort. It is robust to a variety of anomalies and artifacts in speech data, making it suitable for processing large amounts of speech data collected without human supervision under real-world conditions of a long-distance telephone environment.

Although the present invention and its advantages have been described in detail, it should be understood that various changes, substitutions and alterations can be made herein without departing from the spirit and scope of the invention as defined by the appended claims.

APPENDIX I

PART-OF-SPEECH CODES

| Code | Expansion | Example |
|---|---|---|
| ! | abbreviation | num |
| # | number | fifteen |
| & | conjunction | and |
| ' | plural possessive noun | boys' |
| + | superlative | tallest |
| − | contraction | aren't |
| / | auxiliary verb | must |
| 3 | present tense verb marker | burdens |
| < | reflexive pronoun | themselves |
| = | preposition | with |
| ? | question word | who |
| a | adverb | absurdly |
| b | be verb | was |
| c | comparative | taller |
| d | foreign word or phrase | et cetera |
| f | past tense verb marker | rained |
| g | progressive verb marker | raining |
| h | have verb | has |
| i | intransitive verb marker | abound |
| j | adjective | absurd |
| k | interjection | eh |
| n | noun | boy |
| o | past participle marker | outgrown |
| p | plural noun | boys |
| r | article | an |
| s | singular possessive noun | boy's |
| t | transitive verb marker | bode |
| u | pronoun | him |
| v | verb | abolish |
| x | questionable lexical status | boing |
| z | derived entry | flat-bottomed |

What is claimed is:

1. A system for time aligning speech, comprising:
a data interface for inputting speech data representing speech signals from a speaker;
circuitry for inputting an orthographic transcription including a plurality of words transcribed from said speech signals;
circuitry coupled to said inputting circuitry for generating a sentence model indicating a selected order of said words in response to said orthographic transcription;
circuitry coupled to said inputting circuitry for generating word models in response to said orthographic transcription, said word models being associated with respective ones of said words and being generated from pronunciation representations formed independent of said speech data; and
circuitry coupled to said sentence model generating circuitry, to said word model generating circuitry and to said inputting circuitry, for aligning said orthographic transcription with said speech data in response to said sentence model, to said word models and to said speech data.

2. The system of claim 1 wherein said data interface inputs said speech data from a speech signal source and wherein said speech signal source includes a publicly switched telephone network.

3. The system of claim 2 wherein said speech signal source includes a T1 line from a publicly switched telephone network.

4. The system of claim 1 wherein said data interface inputs said speech data from a speech signal source and wherein said speech signal source includes a wireless communications device.

5. The system of claim 4 wherein said speech signal source includes a wireless communications device of an air traffic control system.

6. The system of claim 1 and further comprising circuitry coupled between said inputting circuitry and said word model generating circuitry for generating a list of selected words in said orthographic transcription, and wherein said word model generating circuitry is operable to generate said word models associated with respective ones of said listed words.

7. The system of claim 1 wherein said word model generating circuitry is operable to generate said word models each indicating a plurality of phonetic Hidden Markov Models.

8. The system of claim 1 wherein said aligning circuitry is operable to time align said orthographic transcription with said speech data.

9. A system for time aligning speech, comprising:
a data interface for inputting speech data representing speech signals from multiple interlocutors;
circuitry for inputting an orthographic transcription including a plurality of words transcribed from said speech signals;
circuitry coupled to said inputting circuitry for generating a sentence model indicating a selected order of said words in response to said orthographic transcription;
circuitry coupled to said inputting circuitry for generating word models in response to said orthographic transcription, said word models being associated with respective ones of said words; and
circuitry coupled to said sentence model generating circuitry, to said word model generating circuitry and to said inputting circuitry, for aligning said orthographic transcription with said speech data in response to said sentence model, to said word models and to said speech data.

10. The system of claim 9 wherein said orthographic transcription indicates first and second ones of said words being simultaneous.

11. The system of claim 10 wherein said sentence model generating circuitry is operable to generate said sentence model indicating said first and second words being simultaneous.

12. The system of claim 11 wherein said aligning circuitry is operable to align said orthographic transcription with said speech data in response to said sentence model indicating said first and second words being simultaneous.

13. The system of claim 12 wherein said aligning circuitry is operable to align said orthographic transcription with said speech data, such that a selected one of said first and second words is aligned with said speech data.

14. The system of claim 9 wherein said speech data represent speech signals from multiple interlocutors in conversation.

15. The system of claim 9 wherein said data interface is operable to:
input first speech data from a first channel, said first speech data representing speech signals from an associated first one of said interlocutors; and
input second speech data from a second channel, said second speech data representing speech signals from an associated second one of said interlocutors.

16. The system of claim 15 and further comprising circuitry for combining said first and second speech data, wherein said aligning circuitry is operable to align said orthographic transcription with said speech data in response to said combined speech data.

17. A system for time aligning speech, comprising:
a data interface for inputting speech data representing unscripted speech signals from a speaker;
circuitry for inputting an orthographic transcription including a plurality of words transcribed from said unscripted speech signals;
circuitry coupled to said inputting circuitry for generating a sentence model indicating a selected order of said words in response to said orthographic transcription;
circuitry coupled to said inputting circuitry for generating word models in response to said orthographic transcription, said word models being associated with respective ones of said words; and
circuitry coupled to said sentence model generating circuitry, to said word model generating circuitry and to said inputting circuitry, for aligning said orthographic transcription with said speech data in response to said sentence model, to said word models and to said speech data.

18. The system of claim 17 and further comprising circuitry coupled between said inputting circuitry and said sentence model generating circuitry for normalizing said orthographic transcription, wherein said sentence model generating circuitry is operable to generate said sentence model in response to said normalized orthographic transcription.

19. A method of time aligning speech using process circuitry performing the following steps comprising:
inputting speech data representing speech signals from a speaker;
inputting an orthographic transcription including a plurality of words transcribed from said speech signals;
generating a sentence model indicating a selected order of said words in response to said orthographic transcription;
in response to said orthographic transcription, generating word models from pronunciation representations formed independent of said speech data, said word models being associated with respective ones of said words; and
aligning said orthographic transcription with said speech data in response to said sentence model, to said word models and to said speech data.

20. The method of claim 19 wherein said step of inputting speech data comprises the step of inputting said speech data from a speech signal source.

21. The method of claim 20 wherein said step of inputting speech data comprises the step of inputting said speech data from a publicly switched telephone network.

22. The method of claim 21 wherein said step of inputting speech data comprises the step of inputting said speech data over a T1 line from a publicly switched telephone network.

23. The method of claim 20 wherein said step of inputting speech data comprises the step of inputting said speech data from a wireless communications device.

24. The method of claim 23 wherein said step of inputting speech data comprises the step of inputting said speech data from a wireless communications device of an air traffic control system.

25. The method of claim 19 wherein said step of inputting speech data comprises the step of converting said speech signals into said speech data.

26. The method of claim 19 and further comprising the step of generating a list of selected words in said orthographic transcription, such that said word models are associated with respective ones of said listed words.

27. The method of claim 19 wherein said step of generating said plurality of word models comprises the step of generating said plurality of word models each indicating a plurality of phonetic Hidden Markov Models.

28. The method of claim 19 wherein said step of aligning comprises the step of time aligning said orthographic transcription with said speech data.

29. A method of time aligning speech using process circuitry performing the following steps comprising:
inputting speech data representing speech signals from multiple interlocutors;
inputting an orthographic transcription including a plurality of words transcribed from said speech signals;
generating a sentence model indicating a selected order of said words in response to said orthographic transcription;
in response to said orthographic transcription, generating word models associated with respective ones of said words; and
aligning said orthographic transcription with said speech data in response to said sentence model, to said word models and to said speech data.

30. The method of claim 29 wherein said step of inputting said orthographic transcription comprises the step of inputting said orthographic transcription indicating first and second ones of said words being simultaneous.

31. The method of claim 30 wherein said step of generating said sentence model comprises the step of generating said sentence model indicating said first and second words being simultaneous.

32. The method of claim 31 wherein said step of aligning comprises the step of aligning said orthographic transcription with said speech data in response to said sentence model indicating said first and second words being simultaneous.

33. The method of claim 32 wherein said step of aligning comprises the step of aligning said orthographic transcription with said speech data, such that a selected one of said first and second words is aligned with said speech data.

34. The method of claim 29 wherein said step of inputting speech data comprises the step of inputting speech data representing speech signals from multiple interlocutors in conversation.

35. The method of claim 29 wherein said step of inputting speech data comprises the steps of:
inputting first speech data from a first channel, said first speech data representing speech signals from an associated first one of said interlocutors; and
inputting second speech data from a second channel, said second speech data representing speech signals from an associated second one of said interlocutors.

36. The method of claim 35 and further comprising the step of combining said first and second speech data such that said orthographic transcription is aligned with said speech data in response to said combined speech data.

37. A method of time aligning speech using process circuitry performing the following steps comprising:
inputting speech data representing unscripted speech signals from a speaker;
inputting an orthographic transcription including a plurality of words transcribed from said unscripted speech signals;
generating a sentence model indicating a selected order of said words in response to said orthographic transcription;
in response to said orthographic transcription, generating word models associated with respective ones of said words; and
aligning said orthographic transcription with said speech data in response to said sentence model, to said word models and to said speech data.

38. The method of claim 37 and further comprising the step of normalizing said orthographic transcription, such that said sentence model is generated in response to said normalized orthographic transcription.

39. A system for time aligning speech, comprising:
a data interface for inputting speech data representing unscripted speech signals from multiple interlocutors;

circuitry for inputting an orthographic transcription including a plurality of words transcribed from said unscripted speech signals;
circuitry coupled to said inputting circuitry for generating a sentence model indicating a selected order of said words in response to said orthographic transcription;
circuitry coupled to said inputting circuitry for generating word models in response to said orthographic transcription, said word models being associated with respective ones of said words and being generated from pronunciation representations formed independent of said speech data; and
circuitry coupled to said sentence model generating circuitry, to said word model generating circuitry and to said inputting circuitry, for aligning said orthographic transcription with said speech data in response to said sentence model, to said word models and to said speech data.

40. The system of claim 39 and further comprising circuitry coupled between said inputting circuitry and said sentence model generating circuitry for normalizing said orthographic transcription, wherein said sentence model generating circuitry is operable to generate said sentence model in response to said normalized orthographic transcription.

41. The system of claim 39 wherein said data interface is operable to:
input first speech data from a first channel, said first speech data representing speech signals from an associated first one of said interlocutors; and
input second speech data from a second channel, said second speech data representing speech signals from an associated second one of said interlocutors.

42. The system of claim 41 and further comprising circuitry for combining said first and second speech data, wherein said aligning circuitry is operable to align said orthographic transcription with said speech data in response to said combined speech data.

43. The system of claim 39 wherein said orthographic transcription indicates first and second ones of said words being simultaneous.

44. The system of claim 43 wherein said sentence model generating circuitry is operable to generate said sentence model indicating said first and second words being simultaneous.

45. The system of claim 44 wherein said aligning circuitry is operable to align said orthographic transcription with said speech data in response to said sentence model indicating said first and second words being simultaneous.

46. The system of claim 45 wherein said aligning circuitry is operable to align said orthographic transcription with said speech data, such that a selected one of said first and second words is aligned with said speech data.

* * * * *